United States Patent [19]

Resnick et al.

[11] E Patent Number: Re. 32,523

[45] Reissued Date of Patent: Oct. 20, 1987

[54] SOLAR HEATING

[76] Inventors: Marlene Resnick, 51 Pettee St., #12, Newton Upper Falls, Mass. 02164; Roger C. Sturtevant, P.O. Box 972, South Carver, Mass. 02366

[21] Appl. No.: 894,578

[22] Filed: Aug. 8, 1986

Related U.S. Patent Documents

Reissue of:

[64] Patent No.: 4,494,527
Issued: Jan. 22, 1985
Appl. No.: 448,923
Filed: Dec. 13, 1982

[51] Int. Cl.[4] ..... F24J 3/02

[52] U.S. Cl. ..... 126/422; 126/429; 126/432; 126/449; 126/450

[58] Field of Search ..... 126/417, 419, 422, 428, 126/429, 432, 449, 450

[56] References Cited

U.S. PATENT DOCUMENTS

| | | | |
|---|---|---|---|
| 4,072,141 | 2/1978 | Fillios et al. | 126/432 X |
| 4,121,565 | 10/1978 | Grisbrook | 126/429 X |
| 4,141,337 | 2/1979 | Bergen | 126/429 |
| 4,212,289 | 7/1980 | Hebert | 126/428 |
| 4,282,857 | 8/1981 | Pei | 126/422 |
| 4,294,038 | 10/1981 | Davidson | 126/429 X |
| 4,300,532 | 11/1981 | Olsen | 126/429 X |
| 4,309,983 | 1/1982 | Brill | 126/422 |
| 4,327,795 | 5/1982 | Wheeler | 126/429 X |
| 4,393,860 | 7/1983 | French | 126/429 |
| 4,416,255 | 11/1983 | Secamiglio et al. | 126/429 X |
| 4,436,084 | 3/1984 | Carlston et al. | 126/429 |
| 4,457,298 | 7/1984 | Eubank | 126/429 |
| 4,471,758 | 9/1984 | Jennings | 126/422 |

FOREIGN PATENT DOCUMENTS

| | | | |
|---|---|---|---|
| 2497563 | 7/1982 | France | 126/450 |

*Primary Examiner*—Margaret A. Focarino
*Attorney, Agent, or Firm*—Charles Hieken

[57] ABSTRACT

A solar heater has an outlet conduit above an inlet conduit intercoupling a solar heating chamber with the inside of a building through a window opening. In one form the solar collecting chamber is outside the building below the window and the outlet conduit and inlet conduit are contiguous and pass through the window opening between the windowsill and the lower sash. In another form of the invention the solar collecting chambers are located beside each side of the window and joined at the top by the outlet conduit that passes through an opening between the upper window sash and the top of the window frame and at the bottom by an inlet conduit that passes through an opening between the lower sash and the windowsill. The outlet conduit carries photoelectric cells that provide electrical energy for driving a squirrel-cage fan in the outlet conduit through a mercury switch seated on a damper actuated by a bimetallic coil that closes the damper when the temperature in the outlet conduit goes below a predetermined temperature.

12 Claims, 5 Drawing Figures

SOLAR HEATING

Matter enclosed in heavy brackets [ ] appears in the original patent but forms no part of this reissue specification; matter printed in italics indicates the additions made by reissue.

The present invention relates in general to solar heating and more particularly concerns novel apparatus and techniques for providing solar heating with relatively compact structure that is relatively easy and inexpensive to fabricate and install using an existing window without appreciably reducing the viewing area of the window.

A search of subclasses 429 and 430 of class 126 uncovered U.S. Pat. Nos. 246,625, 2,931,578, 3,990,635, 4,046,133, 4,050,443, 4,111,183, 4,212,289, 4,237,865, and 4,257,396.

U.S. Pat. Nos. 4,237,865, 4,111,183, 4,046,133, 4,050,443, 4,257,396 and 246,625 disclose structures built upon the side of a building that allow room air to enter, circulate through and be heated by the sun before being returned to the room. U.S. Pat. No. 4,212,289 patent discloses solar shutters for absorbing heat energy and radiating it inwardly toward the room. U.S. Pat. No. 3,990,635 patent discloses a window mounted solar heating unit.

It is an important object of the invention to provide improved solar heating methods and means allowing exchange of air through a small opening in the window while negligibly obstructing the window.

According to the invention, there is solar energy collecting panel means for location outside a building adjacent to a building window negligibly obstructing the window opening and heat transfer conduit means for exchanging air with the inside of the room and the solar collecting panel means through a small opening in the window. According to one aspect of the invention the solar panel means is supported in a structure adapted to be located below a window adjacent to means defining an air exchange channel having generally parallel generally vertical conduits interconnected at the bottom, a first of which is adjacent to the building and connected at the top to means defining a cool air inlet adapted to be located adjacent to the windowsill and extending into the building. The second generally vertical conduit is adjacent to the panel means and adapted to be separated from the building by the first conduit and is connected at the top to means defining a warm air outlet adjacent to the cool air inlet and adapted to be located above the latter adjacent to the slightly opened window sash and extending into the room for releasing warm air into the room. The structure defining the means defining the cool air inlet and warm air outlet is adapted to fit snugly between the bottom of the window sash and the windowsill, preferably in substantially sealing relationship so that negligible air is exchanged between the inside and outside of the building in the gap surrounding the cool air inlet and warm air outlet.

According to another aspect of the invention, the solar collector panel means is adapted to be positioned beside the building window with means defining a cool air inlet adapted to pass through a gap between the windowsill and the bottom of the lower sash and means defining a warm air outlet adapted to be positioned between the top window sash and the top of the window frame and communicate with air conduits adjacent to the solar collector panel means adapted to be positioned vertically. Preferably, the means defining one of the conduits may carry photoelectric cells responsive to solar energy for providing electrical energy for operating a fan means, such as a squirrel-cage fan, in the warm air outlet. Preferably there is thermally operated vent means for selectively blocking the air flow path between inlet and outlet when the air temperature in the warm air outlet is below a predetermined temperature. Preferably there is means responsive to the damper means being open for energizing the fan means.

Numerous other features, objects and advantages of the invention will become apparent from the following specification when read in connection with the accompanying drawing in which.

Figure 1:
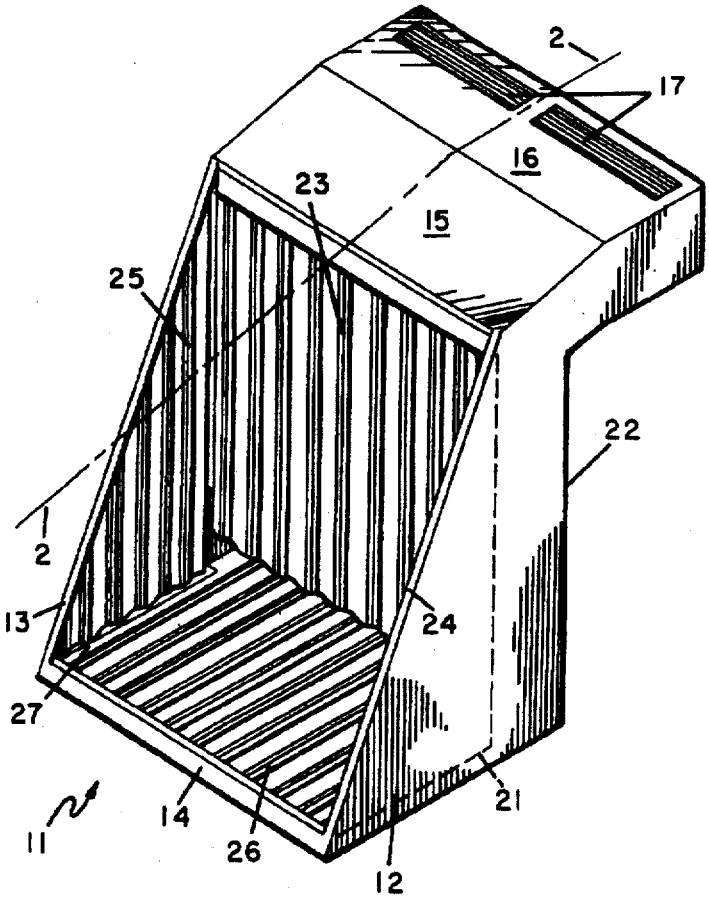
FIG. 1 is a perspective view of an embodiment of the invention adapted for installation through a narrow gap between the sill and lower sash of a double-hung window.

With reference now to the drawing and more particularly FIG. 1 thereof, there is shown a passive solar heater according to the invention adapted to be supported on a windowsill without appreciably reducing the viewing area of the window. The heater 11 comprises side panels 12 and 13, bottom panel 14, upper sloping panel 15 and top panel 16 having vents 17. There is a back panel 21 and a front panel 22. Solar collector panels of corrugated aluminum 23, 24, 25 and 26 line rear panel 21, side panels 12 and 13 and bottom panel 14, respectively. A sloping double glazed cover 27 completes the enclosure of the solar heated volume of triangular cross section. (FIG. 2).

Figure 2:
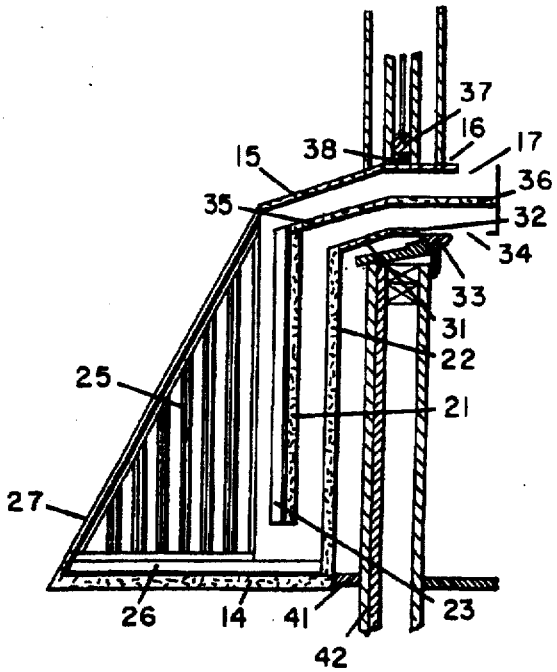
FIG. 2 is a sectional view through section 2—2 of FIG. 1 with the structure of FIG. 1 installed in the gap between the windowsill and the lower sash of a double-hung window.

Referring to FIG. 2, there is shown a view through section 2—2 of the heater of FIG. 1 mounted in a double-hung window. Front panel 22 is connected at the top to an upwardly sloping lower panel 31 that is connected to a lower panel 32 that rests on windowsill 33 and is formed with a vent 34 functioning as a cool air inlet.

Front panel 21 is connected at the top to an intermediate upwardly sloping panel 35 that is connected to a horizontal intermediate panel 36 so that panels 21, 35 and 36 divide and bound the generally downward flow of generally cool air from the generally upward flow of warm air. The bottom of the window sash 37 is urged downward upon a compressible sealing strip 38 of polyurethane or other suitable insulating material to effect a good seal between the window sash and upper panel 16. A support bracket 41 connected between the bottom of front panel 22 and the outside wall 42 of the building keeps the heater oriented as shown with front wall 22 essentially parallel to outside wall 42.

Having described the structural arrangement, its more of operation will be described. Solar energy incident through double-glazed cover 27 upon the corrugated aluminum solar collector panels 23, 24, 25 and 26 heats the air in the chamber of triangular cross section. The warmed air rises and flows through the conduit between intermediate panels 35 and 36 and upper panels 15 and 16 through warm air outlet 17 into the room. This upward flow of air creates a pressure drop which draws cool air through cool air inlet 34 into the conduit between intermediate panels 35 and 36 and lower panels 31 and 32 that continues flowing downward in the conduit between rear panel 21 and front panel 22 to flow into the heating chamber in the channel below solar collector panel 23 and rear member 21. The invention thus provides passive solar heating through a window opening of a south-facing window while negligibly obstructing the view through the window. The invention is relatively easy and inexpensive to fabricate, use and install.

Figure 3:
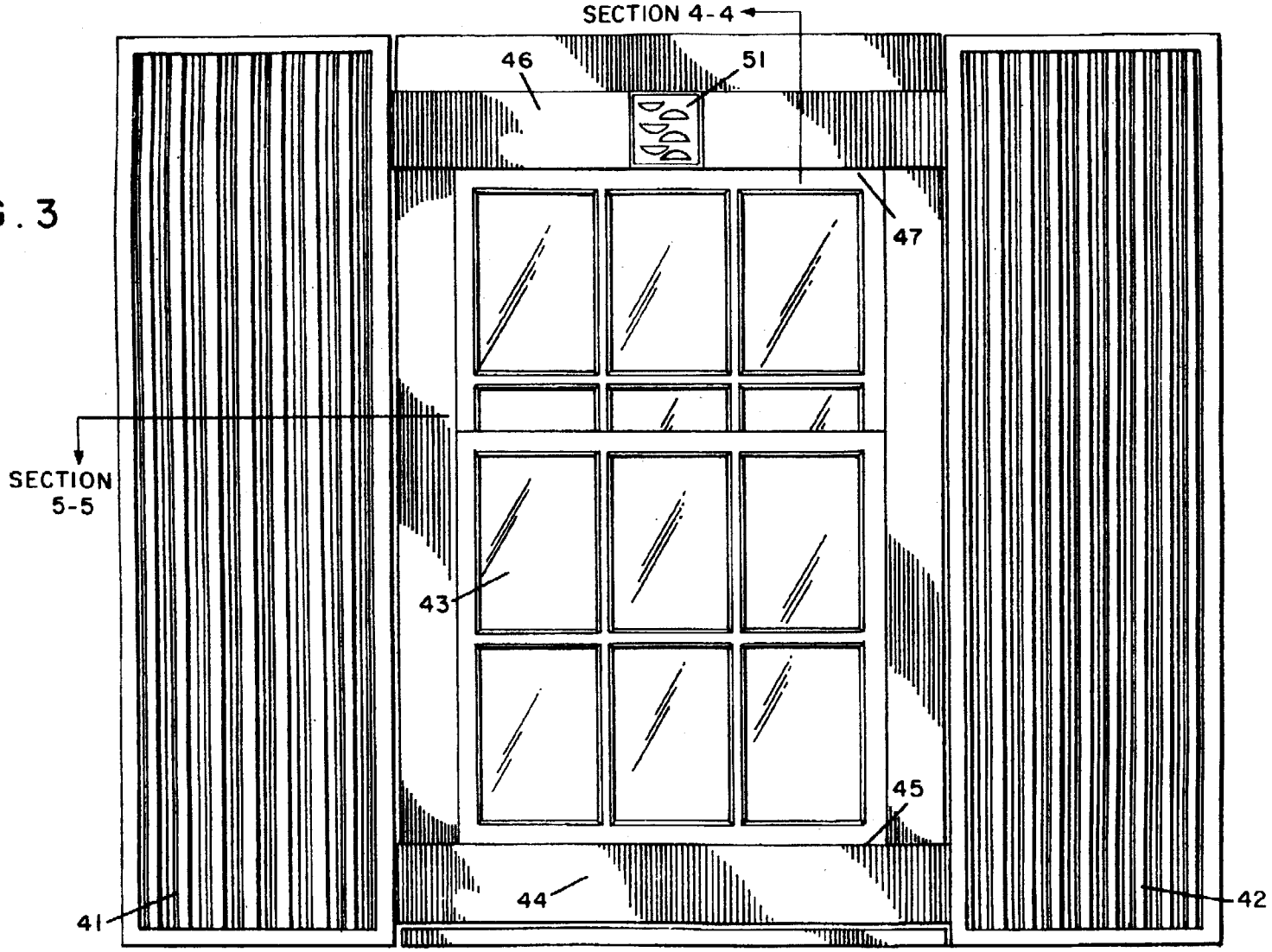
FIG. 3 is a plan view of another embodiment of the invention having solar collecting exterior shutters.

Referring to FIG. 3, there is shown a front view of another embodiment of the invention having the solar collector chambers 41 and 42 as shutters beside a double-hung window 43. The solar collector heating chambers 41 and 42 are interconnected at the bottom by a lower transfer tube 44 at the bottom having a cool air inlet passing through the space between lower sash 45 and the windowsill. An upper transfer tube 46 intercouples solar collector chambers 41 and 42 having a warm air outlet that passes through the gap between upper sash 47 and the top of the window frame into the room. Upper transfer tube 46 also may carry a panel 51 of photoelectric transducers for converting light energy into electrical energy.

Figure 4:
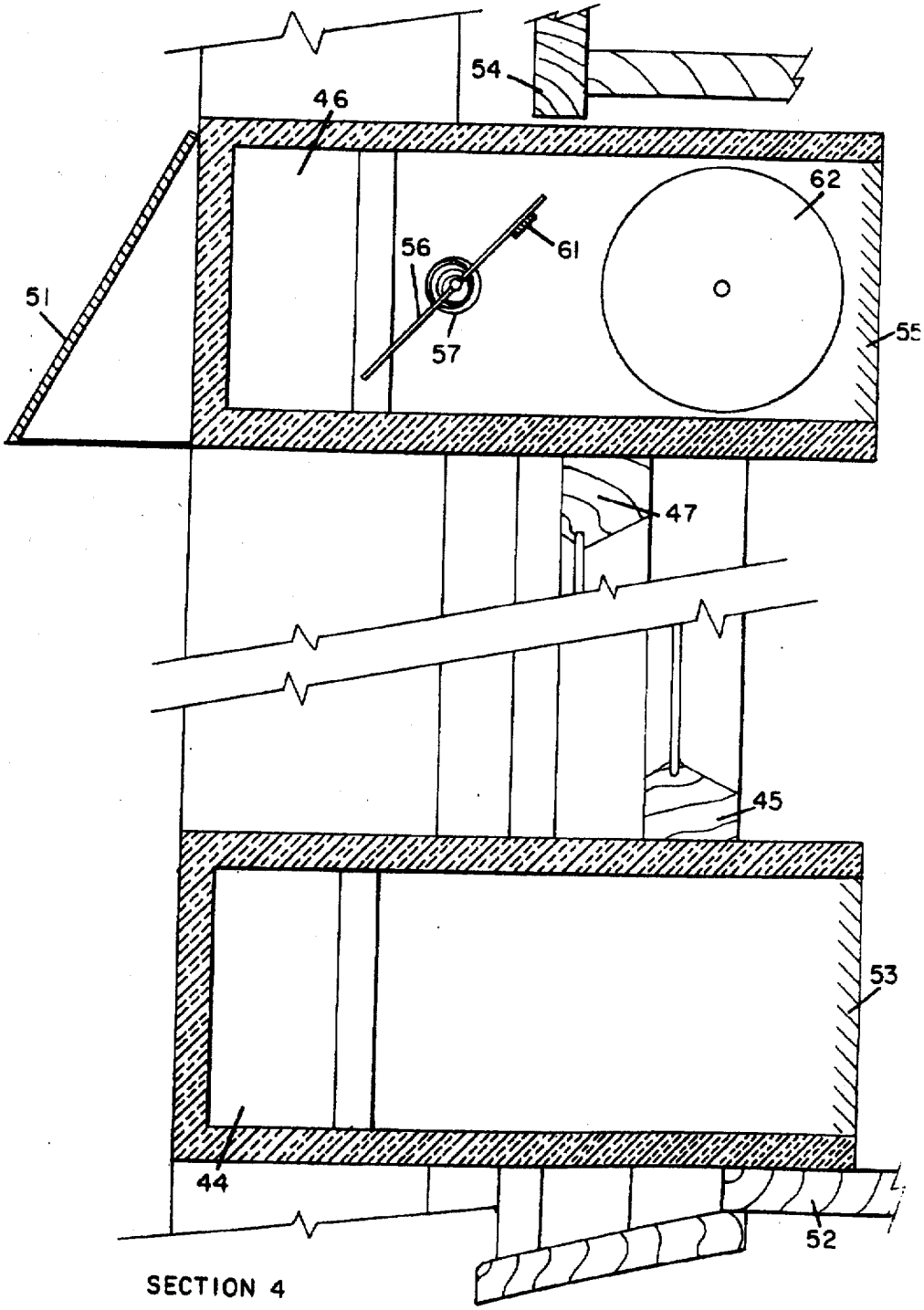
FIG. 4 is a broken sectional view through section 4—4 of FIG. 3.

Referring to FIG. 4, there is shown a broken sectional view through section 4—4 of FIG. 3. Lower transfer tube 44 is seated between lower sash 45 and windowsill 52 and has a cool air inlet 53. Upper transfer tube 46 is seated between upper sash 47 and the top of window frame 54 and has a warm air outlet 55. Preferably upper transfer tube 46 includes a damper 56 attached to a bimetallic coil 57 that closes damper 56 when the temperature is below a predetermined value. Preferably damper 56 carries a mercury microswitch 61 for closing the circuit between the photoelectric cells on panel 51 and squirrel cage fan 62 to energize the latter when damper 56 is open and thereby provide forced warm air heating. When damper 56 is closed, mercury microswitch 61 interrupts the flow of electrical energy between the photoelectric cell on panel 51 and squirrel cage fan 62.

Figure 5:
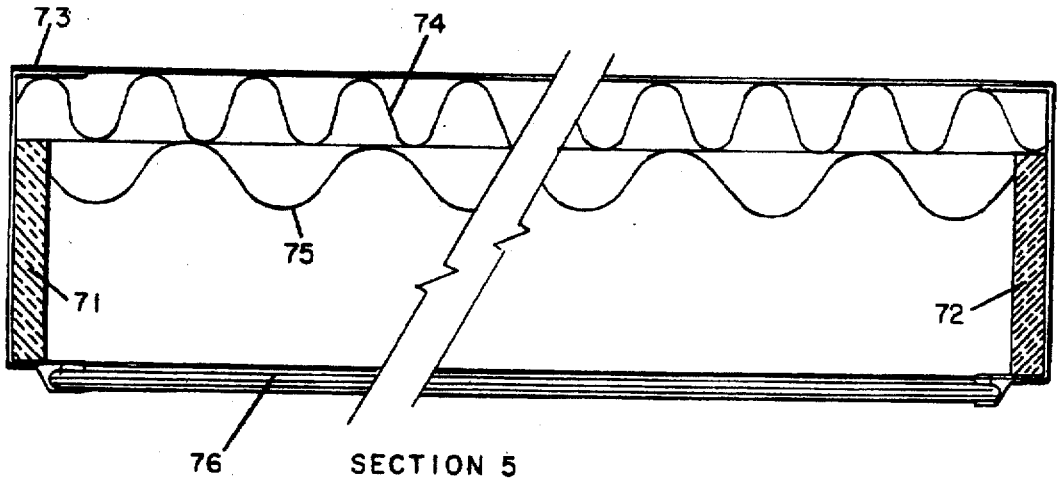
FIG. 5 is a broken sectional view through section 5—5 of FIG. 3.

Referring to FIG. 5, there is shown a sectional view through section 5—5 of FIG. 3 illustrating the structure of solar collector chamber 41, solar collector chamber 42 being essentially the same. Each chamber comprises a pair of side panels 71 and 72, typically 1" insulation board inside an aluminum extrusion 73 with a layer of insulation 74 adjacent to the corrugated aluminum collector 75. A double-glazed panel 76 covers the collector chamber.

This embodiment of the invention has a number of advantages. The collector chambers provide a pleasing appearance as shutters. Using the top and bottom openings of the window allows air flow while negligibly interfering with the view though the window. The fan-damper arrangement enhances heat flow without using external energy.

There has been described novel apparatus and techniques for providing solar heating with apparatus that is relatively inexpensive and easy to fabricate and install through existing windows in an attractive package without appreciably interfering with the view through the window. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Solar heating apparatus for exchanging energy through double-hung window openings comprising, means defining a solar collector chamber means for heating air therein in response to solar energy, said solar collector chamber means having inlet means at the bottom for receiving cool air and outlet means at the top for expelling warm air, inlet conduit means adapted to pass through an opening at the bottom of a double-hung window between the lower sash of said window and the window sill for coupling said inlet means to the inside of a building through said bottom opening and receiving cool air therethrough for warming in said solar collector chamber means, and outlet conduit means for coupling said outlet to the inside of said building through an opening at the top in said double-hung window between the upper sash of said window and the top of the window frame for delivering warm air to said building expelled through said outlet means, said outlet conduit means being above said inlet conduit means, said solar collector chamber means being adapted for positioning beside said double-hung window with said outlet conduit means adapted for insertion through said top opening and said inlet conduit means adapted for insertion through said bottom opening without appreciably obstructing the view through said double-hung window except through said top and bottom openings with the unobstructed viewing area through said window being significantly greater than the area of said top and bottom openings, said solar collector chamber means comprising solar collector chambers separated by the window width adjacent to each side of said window and intercoupled at the top by said outlet conduit means and at the bottom by said inlet conduit mean.

2. Solar heating apparatus in accordance with claim 1 and further comprising, photoelectric transducing means carried by one of said conduit means for converting solar energy into electrical energy, electrically operated fan means in one of said inlet and outlet conduit means, and means for coupling electrical energy from said photoelectric transducing means to said electric fan means as driving power for producing a forced air flow directing air out said outlet conduit means.

3. Solar heating apparatus in accordance with claim 1 and further comprising, photoelectric transducing means carried by one of said conduit means for converting solar energy into electrical energy, electrically operated fan means in one of said inlet and outlet conduit means, means for coupling electrical energy from said photoelectric transducing means to said electric fan means as driving power for producing a forced air flow directing air out said outlet conduit means, and thermal sensing means responsive to the temperature of air in said outlet conduit means being less than a predetermined value for interrupting the flow of power from said photoelectric transducing means to said electric fan means.

4. Solar heating apparatus in accordance with claim 3 wherein said thermal sensitive means comprises a damper in said outlet conduit means and bimetallic means attached to said damper for closing said damper when the temperature in said outlet conduit means is less than a predetermined value, said damper carrying a mercury switch connected between said photoelectric transducing means and said electric fan means.

*5. Solar heating apparatus for exchanging energy through openings near the top and bottom of a window comprising,*

*means defining a solar collector chamber means for heating air therein in response to solar energy,*

*said solar collector chamber means having inlet means at one of the top and bottom for receiving cool air and outlet means at the other of said top and bottom for expelling warm air forming a window shutter means for being positioned beside a window,*

*inlet conduit means adapted to pass through an inlet opening near one of the top and bottom of a window for coupling said inlet means to the inside of a building through said inlet opening and receiving cool air therethrough for warming in said solar collector chamber means,*

*and outlet conduit means for coupling said outlet to the inside of said building through an outlet opening near the other of said top and bottom of said window for delivering warm air to said building expelled through said outlet means,*

*said outlet conduit means being at a height different from said inlet conduit means and separated therefrom by a distance of the order of the height of said window,*

*said solar collector chamber means being adapted for positioning beside said window with said outlet conduit means adapted for insertion through said outlet opening and said inlet conduit means adapted for insertion through said inlet opening without appreciably obstructing the view through said window with the unobstructed viewing area through said window being significantly greater than the area of said inlet and outlet openings,*

*said solar collector chamber means comprising solar collecting chambers separated by the window width adjacent to each side of said window.*

*6. Solar heating apparatus in accordance with claim 5 and further comprising,*

*photoelectric transducing means carried by said apparatus for converting solar energy into electrical energy,*

*electrically operated fan means in one of said inlet and outlet conduit means,*

*and means for coupling electrical energy from said photoelectric transducing means to said electric fan means as driving power for producing a forced air flow directing air out said outlet conduit means.*

*7. Solar heating apparatus in accordance with claim 5 and further comprising,*

*photoelectric transducing means carried by said apparatus for converting solar energy into electrical energy,*

*electrically operated fan means in one of said inlet and outlet conduit means,*

*means for coupling electrical energy from said photoelectric transducing means to said electric fan means as driving power for producing a forced air flow directing air out said outlet conduit means,*

*and thermal sensing means responsive to the temperature of air in said outlet conduit means being less than a predetermined value for interrupting the flow of power from said photoelectric transducing means to said electric fan means.*

*8. Solar heating apparatus in accordance with claim 5 wherein said thermal sensitive means comprises a damper in said outlet conduit means and bimetallic means attached to said damper for closing said damper when the temperature in said outlet conduit means is less than a predetermined value,*

*said damper carrying a mercury switch connected between said photoelectric transducing means and said electric fan means.*

*9. Solar heating apparatus in accordance with claim 5 wherein said inlet means is at the bottom and said outlet means is at the top.*

*10. Solar heating apparatus in accordance with claim 6 wherein said inlet means is at the bottom and said outlet means is at the top.*

*11. A solar heating apparatus in accordance with claim 7 wherein said inlet means is at the bottom and said outlet means is at the top.*

*12. Solar heating apparatus in accordance with claim 8 wherein said inlet means is at the bottom and said outlet means is at the top.*

* * * * *